United States Patent [19]

Peck

[11] 3,853,002

[45] Dec. 10, 1974

[54] VEHICULAR PERFORMANCE ANALYZER

[75] Inventor: Gordon H. Peck, Las Cruces, N. Mex.

[73] Assignee: Autotronic Controls Corporation, El Paso, Tex.

[22] Filed: Aug. 6, 1973

[21] Appl. No.: 386,108

[52] U.S. Cl. ................. 73/133 R, 324/162, 73/116
[51] Int. Cl. .......................................... G01m 15/00
[58] Field of Search............ 73/133 R, 116; 324/162

[56] References Cited
UNITED STATES PATENTS
3,543,175  11/1970  Prout et al. ........................ 330/20 X
3,729,989  5/1973  Little................................. 73/133 R Primary Examiner—Jerry W. Myracle
Attorney, Agent, or Firm—Bates: Marcus L.

[57] ABSTRACT

A performance analyzer for use in conjunction with prime movers and vehicles, wherein circuitry electrically connected to the vehicle produces a first electrical signal having a frequency proportional to the vehicle velocity, as for example, measurement of the rotational velocity of a member associated with the prime mover. Other circuitry is provided for producing an electrical signal proportional to the rate of change of the first signal. The two electrical signals are multiplied together electrically and connected to a measuring device to thereby ascertain the available power of the vehicle.

The circuitry includes apparatus by which one of the signals can be used to measure the velocity of the vehicle or the rpm of the prime mover, while also enabling the acceleration of the prime mover to be measured by bypassing the multiplier. Hence the analyzer of the present invention measures the velocity, acceleration, and available power of the vehicle.

5 Claims, 4 Drawing Figures

VEHICULAR PERFORMANCE ANALYZER

BACKGROUND OF THE INVENTION

There are many instances where the performance of a mechanism needs to be kept under surveillance; as for example, a vehicle such as an automobile, a prime mover such as the draw works associated with a drilling rig, a reciprocating or jet engine on an aircraft, or a soap box derby going downhill under the force of gravity.

Heretofore those skilled in the art have devised clever means by which the torque exerted by a rotating wheel which supports a vehicle has been measured. However, the apparatus involved in such measurements is complex, expensive, and difficult to maintain. Moreover, the apparatus usually involves special equipment which is limited for use in a special test vehicle.

Measurement of acceleration generally involves the use of a weight connected to circuitry so that relative movement between the weight and the vehicle provides for the measurement of the acceleration of the vehicle. Others have proposed torsion apparatus interposed in series relationship between co-acting parts to attain power or acceleration data.

Since acceleration is proportional to change in velocity divided by change in time, and, since force multiplied by velocity is proportional to horsepower, it follows that the performance of a vehicle can be analyzed if the velocity, rate change in velocity, and mass can be measured.

It is therefore desirable to provide circuitry of an uncomplicated form which can measure acceleration, velocity, net horsepower, as well as rpm of the vehicle power plant. Such an expedient would be desirable for incorporation into an automotive type vehicle so that velocity or rpm, acceleration, and net horsepower of the vehicle can be ascertained instantaneously, reliably, and economically with hardly any modifications of the vehicle being required.

SUMMARY OF THE INVENTION

Apparatus for measuring the performance characteristics of a vehicle, of a prime mover, or of any other moving apparatus or mechanism, comprising: first means in the form of circuitry electrically connected to the vehicle for producing a first electrical signal having a frequency which is proportional to movement of the subject apparatus being analyzed; a second circuit means connected to the first electrical signal produces a second electrical signal which is proportional to the rate of change of the first signal. A multiplier means, in the form of circuitry, multiplies the first and second signals together to produce a third electrical signal which is proportional to the net horsepower of the prime mover or the moving apparatus.

The first signal is provided by a tachometer means which receives an input signal proportional to the rotational velocity of the prime mover of the vehicle, for example. An input pulse shaper provides a signal to a signal conditioner and differentiator so that a monostable multivibrator can be provided with an optimum input signal. The signal from the monostable multivibrator can be used as an rpm indicator.

The signal from the monostable multivibrator is filtered, connected to a source follower driver circuit and to a differentiator circuit and amplifier. The output of the amplifier is connected to a measuring means so that acceleration of the prime mover can be measured.

In measuring the power output of the prime mover the output of the multivibrator is multiplied by the output of the amplifier with the resultant signal being measured by any suitable means.

Accordingly, a primary object of the present invention is to provide improvements in apparatus for measuring the performance of a vehicle.

Another object of the invention is the provision of method and apparatus for analyzing the performance of a moving apparatus or vehicle.

A further object of the invention is the provision of method and apparatus for determining the net horsepower of a vehicle.

A still further object of the invention is the provision of method and apparatus for analyzing the performance of an object which is moved with an increasing or decreasing cyclic motion.

Another and still further object of this invention is to disclose and provide improvements in circuitry which can measure velocity, rpm, acceleration, and power output of a vehicle having a prime mover therein.

An additional object of the instant invention is the provision of method and apparatus for measuring velocity, acceleration, and net power output of a vehicle relative to the ground.

These and various other objects and advantages of the invention will become readily apparent to those skilled in the art upon reading the following detailed description and claims and by referring to the accompanying drawings.

The above objects are attained in accordance with the present invention by the provision of a method for use in conjunction with apparatus fabricated in a manner substantially as described in the above abstract and summary.

DETAILED DESCRIPTION OF THE INVENTION

Figure 1:
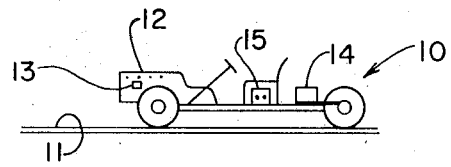
FIG. 1 is a diagrammatical side elevational view of a vehicle having a prime mover therein, with the apparatus of the present invention being operatively associated therewith.

In FIG. 1 there is disclosed a vehicle 10, which can take on any number of forms, and which is supported from a ground supporting surface 11 by the illustrating pneumatic wheels. A prime mover, in the form of an engine 12, has a distributor 13 thereon with the distributor being connected to a storage battery 14 in the usual manner. Apparatus 15, made in accordance with the present invention, is located on and connected to the vehicle in any number of different manners as will be evident later on in this disclosure.

Figure 2:
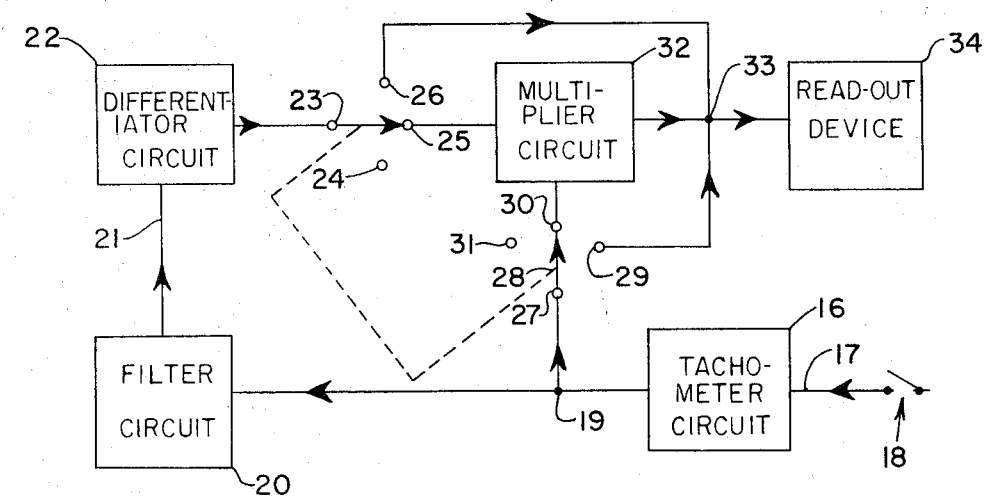
FIG. 2 is a flow sheet which diagrammatically sets forth one of the embodiments of the present invention.

As seen in the flow sheet of FIG. 2, the present invention is comprised of a tachometer circuit 16 having an input signal 17 electrically connected to the points 18 of the vehicle distributor. The output of the tachometer circuit is connected to junction 19 which in turn forms the input of the filter circuit 20. The output of the filter circuit is connected at 21 to the input of a differentiator circuit as seen illustrated by numeral 22.

The differentiator output is connected to junction 23 of a switch arm so that the output can be selectively connected to either of terminals 24, 25, or 26. Junction 19 is connected to junction 27 of a switch arm 28 so that the switch can connect junction 27 to either of terminals 29, 30, or 31.

Switch arms 23 and 28 are interlocked by any prior art means so that the two arms are selectively and simultaneously connected to pairs of terminals 24 and 29, 25 and 30, or 26 and 31.

Junctions 25 and 30 are individually connected to a multiplier circuit 32 having the output thereof connected to junction 33. Junction 33 is connected to the input of a read-out device 34 so that the current value at 33 can be ascertained.

Figure 3:
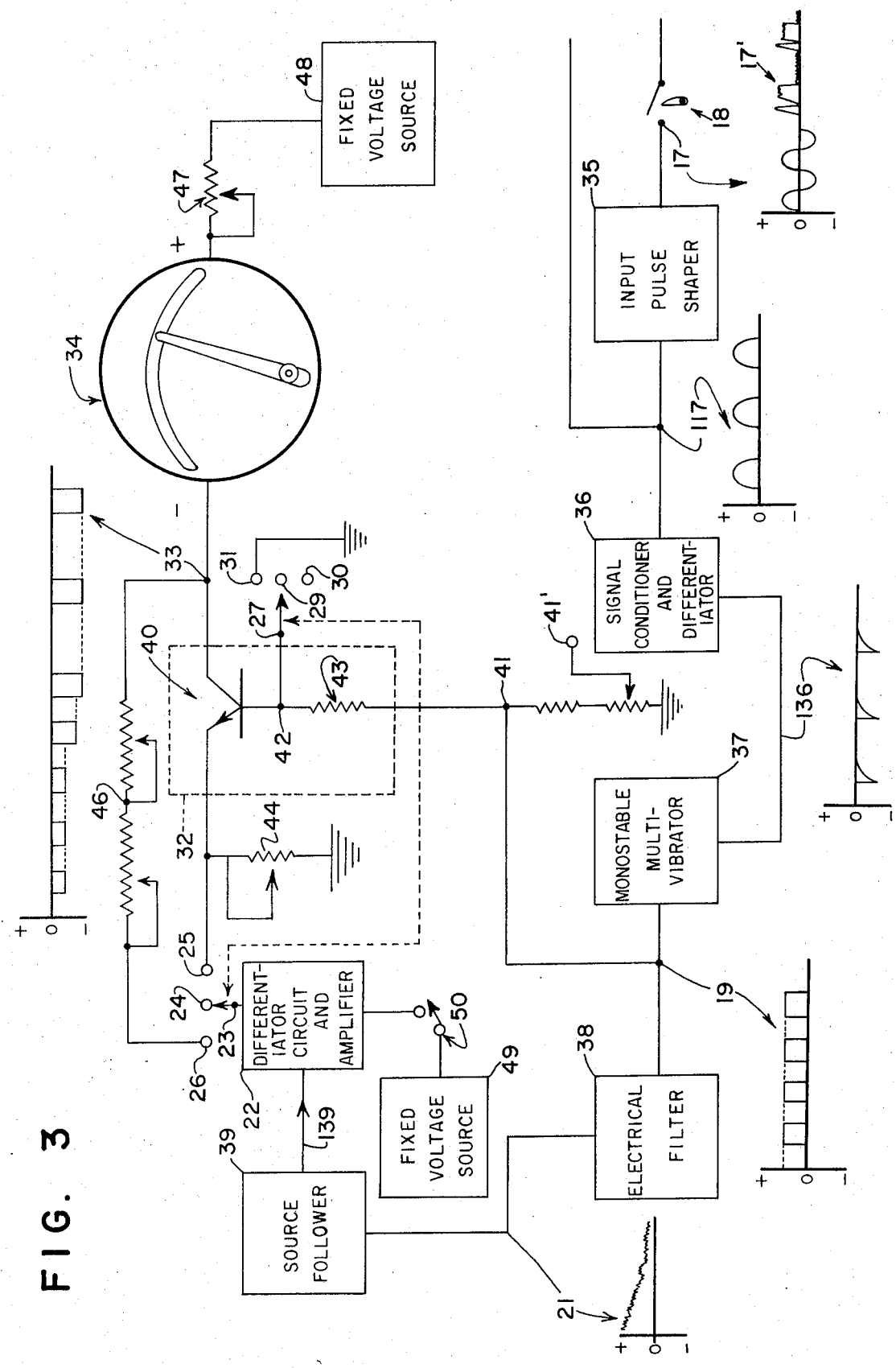
FIG. 3 is a part diagrammatical, part schematical representation which sets forth one embodiment of the present invention; and, FIG. 4 is a detailed circuitry showing one specific form of the present invention.

As more specifically set forth in the preferred embodiment of FIG. 3, the tachometer circuit is comprised of an input pulse shaper 35 connected to a signal conditioner and differentiator 36 which in turn is connected to a monostable multivibrator 37. Junction 117 provides for an auxiliary input to the signal conditioner.

Located between the differentiator and amplifier 22 and the filter 38 is a source follower 39 for improving the response rate of elements 22 and 38. The before mentioned multiplier 32 is comprised of a transistor 40. Across junctions 41, 42 is a current limiting resistor 43. Variable resistor 44 connects junction 25 to ground while junction 45 connects the collector of the transistor to the before mentioned measuring apparatus 34. The illustrated series connected rheostats are connected between junction 26 and 33 for calibrating the output from 22. Rheostat 47 connects fixed voltage source 48 to the before mentioned meter 34.

The fixed voltage source 49 can be connected to the differentiator circuit and amplifier by means of switch 50 so that a simulated acceleration voltage can be employed for calibration purposes.

Figure 4:
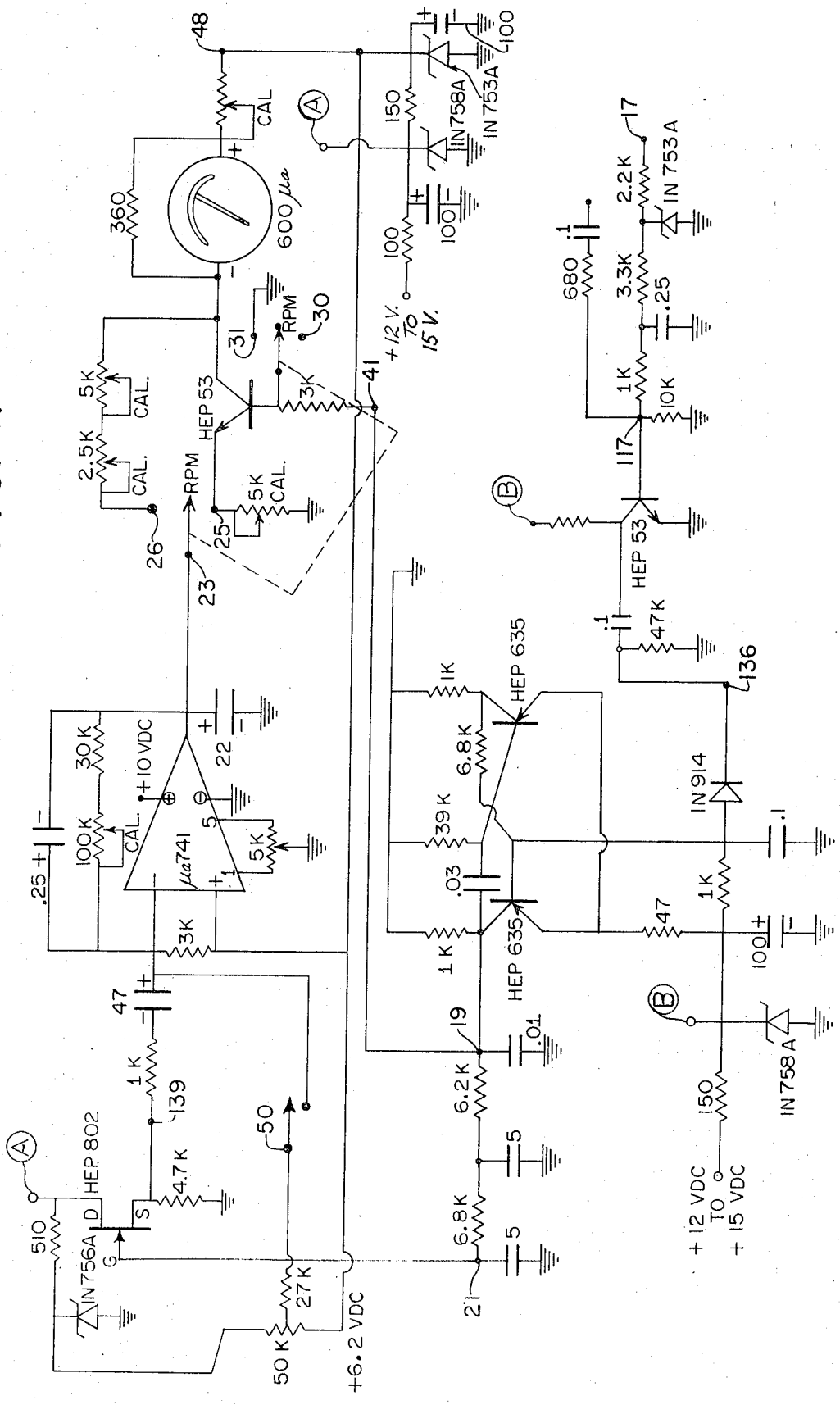

In FIG. 4 there is illustrated one suitable form of circuitry which can be used in carrying out the preferred embodiment of the present invention, with the various circuitry being blocked off into portions which relates to the foregoing figures. Those skilled in the art, having analyzed the foregoing along with the remainder of this disclosure, will readily understand the circuitry and its application to the present invention. Throughout the goregoing figures of the drawings, various numerals or elements, wherever logical or possible to do so, relate to the same or similar numerals or elements.

OPERATION

The present invention relates to both method and apparatus for the measurement and analysis of various performance and performance potential characteristics of a moving vehicle, a prime mover, or any moving object. In particular, the present invention is related to the measurement of net horsepower, net horsepower-to-weight ratio, acceleration, torque, velocity, and rpm, such as a moving vehicle having a prime mover therein, for example.

The present invention utilizes a sensing element at 17 which can take on any number of different forms as for example, an existing electrical signal such as the breaker points on the distributor of a prime mover, or a generator means connected to a member undergoing cyclic motion, as for example, the turbine shaft of a jet engine, or the wheel of a ground supported vehicle, so long as the sensing information is related to the velocity of the vehicle or the moving object being analyzed. The sensing information is converted into a particular electrical signal which can be derived from visual, audible, mechanical, or recordable indications of the velocity characteristics of the apparatus undergoing analysis. In its simplest form the input signal is derived from the breaker points 18 of the prime mover of an automotive type vehicle. Assuming switches 23 and 27 to be connected to terminals 25 and 30, the read-out device 34 will measure the net horsepower of the prime mover for the reason that the frequency imposed upon the base of the transistor is a variable related to velocity while the signal imposed upon the emitter of the transistor is representative of the rate of change in the velocity, and accordingly, acceleration multiplied by velocity is proportional to power. It should be noted that the measured or observed net power at 34 is not the horsepower delivered by the power plant but instead represents the net horsepower of the moving body.

Assuming that switches 23 and 27, respectively, are connected to terminals 24 and 30, respectively, the read-out device will measure the signal produced at 19 because the circuitry 22 has been disconnected from the transistor.

Assuming switches 23 and 27, respectively, are connected to terminals 26 and 31, respectively, there will be no current flow except from the differentiator 22 to the junction 33 and accordingly, the readout device will be measuring the rate of change of the D.C. voltage representing the rpm or velocity at 23. Therefore, the magnitude of the reading is proportional to the acceleration of the vehicle.

Looking again to the details of FIG. 3 in conjunction with FIG. 4, it will be appreciated that the input pulse shaper limits the amplitude of the pulse and shapes the pulse to a more desirable form which eliminates voltage spikes and amplitude variations within the input pulse. The signal conditioner further conditions the signal received from 35, and in its preferred form, is a well known saturated amplifier circuitry. The differentiator of circuitry 36 produces a proper trigger pulse which serves as the input to the monostable multivibrator 37. The output of 37 therefore consists of a pulse of current having a constant amplitude and width, and with the time spacing between the output pulses varying in direct ratio with the rpm of the vehicle engine, for example, for the reason the ignition points "make and break" in direct proportion to engine speed. Accordingly, the signal effected at 19 in this instance ordinarily will be engine rpm multiplied by 4 for a four cycle, eight cylinder internal combustion engine, for example.

The output of 37 is filtered at 38 so as to convert the signal to a D.C. voltage at 21 which is proportional to engine rpm, which in turn is proportional to the vehicle velocity.

The signal at 17 or 19 can also be obtained by directly driving a signal generator by the speedometer chain drive, or by one of the rotating wheels.

The source follower allows the filter circuit and the differentiator circuit to respond more rapidly to changes in the signal. The output of the source follower at 139 provides the input signal for the low frequency differentiator 22 which differentiates the varying voltage produced by the change in pulse freuquency at 19, which is also directly proportional to change in the vehicle velocity. Hence, the output of the differentiator at 23 is proportional to the acceleration or deceleration of the vehicle. The measured signal at 23 therefore constitutes an accelerometer which measures the magnitude of the acceleration of the vehicle.

The output of the differentiator, which includes an operational amplifier is selectively connected to the emitter of the multiplier which preferably is in the form of a multiplying transistor. The collector is connected to a read-out meter which preferably is a milliamp meter having the positive side thereof connected to a fixed voltage source through a calibrated resistor 47. The base of the transistor is connected to a current limiting resistor and to the unfiltered output of 37.

In the horsepower measuring mode, the amplitude of the voltage applied to the emitter of the transistor is proportional to the acceleration of the vehicle while the pulse signal spacing going to the base of the transistor is proportional to the vehicle's velocity. The resulting pulse going through the milliamp meter is therefore determined by both the velocity (pulse spacing) as well as the acceleration (pulse height) of the vehicle. Since acceleration multiplied by velocity is a measure of horsepower, when vehicle weight is considered, the present apparatus at 15 provides a measurement which is proportional to the net horsepower output of the vehicle. Where the vehicle weight is taken into consideration, the exact horsepower can be measured, otherwise, the readout would be horsepower to weight ratio, or performance potential.

Bypassing the multiplying transistor enables the differentiator output at 23 to be used as a measure of acceleration. When the switches are connected in the rpm mode, the emitter of the transistor is then connected to ground by the illustrated calibrated resistor so that the multiplying transistor serves as a monostable multivibrator meter driver. Since the emitter resistor is connected to a fixed voltage source (ground) the multiplying transistor output must be proportional to the velocity of the vehicle or to engine rpm.

The output at 23 varies between +6.2 and +2 volts, respectively, from zero to maximum acceleration, respectively. The fixed voltage source at 48 is +6.2 volts; therefore, under zero acceleration conditions there is no potential across the meter when measuring acceleration, net horsepower, or net horsepower-to-weight ratio.

A fixed voltage source 49 and switch 50 provides means for calibration of the apparatus. The apparatus can be calibrated in any number of different manners, as for example, measuring the velocity and engine rpm by known means, whereupon the torque can be calculated by considering the tire diameter which supports the vehicle. The net horsepower-to-weight ratio and net horsepower may also be derived from this information. The various rheostats disclosed enable calibration of the variables depending upon the position of the switch, or the performance being studied.

With the apparatus in the horsepower measuring configuration, and operatively connected to a vehicle moving down a highway at constant velocity, +6.2 volts will be received at the emitter and a pulse signal spacing at 41 will be generated which is proportional to the vehicle velocity. Accordingly, the read-out meter 34 will be subjected to a voltage differential when the vehicle is accelerated which is actually proportional to the acceleration and velocity of the vehicle. Should the vehicle suddenly be accelerated the voltage at 23 will be reduced thereby effecting a corresponding change on the read-out meter proportional to the power required to effect the acceleration. On the other hand, should the vehicle be decelerated, the voltage at 23 will increase which in turn will affect the voltage at 33 thereby causing the read-out meter to effect the change. Should the vehicle encounter added resistive forces such as a head wind, or an inclined roadway, and the manifold pressure of the prime mover increased in order to maintain a constant velocity, there will be no change effected in the read-out meter because there has been no change in the net horsepower of the vehicle although there has been a change in the actual horsepower output of the prime mover in order to achieve the constant net horsepower of the moving vehicle. Under these conditions the pulse spacing at 41 and the voltage at 23 remain constant since the velocity of the vehicle remains constant.

Hence, the net horsepower is defined herein as the horsepower available to accelerate the vehicle at the instant the measurement is performed. The maximum net horsepower can be used to determine the amount of available spare accelerating horsepower. The net horsepower readout on the instrument indicates the net horsepower generated to produce a particular acceleration at a particular velocity in a particular environment.

Those skilled in the art, having read this disclosure, will now appreciate that element 44 can be adjusted to read velocity rather than rpm. The elements connected to junction 46 can be used to calibrate the meter to correspond to an accelerometer reading by using a reference vehicle, or alternatively, to provide an indication of torque effected at the power tires.

The amplifier gain at 22 can be used to calibrate the readout meter for net horsepower or net horsepower-to-weight ratio.

Those skilled in the art, having digested the foregoing portion of this disclosure, will now appreciate that the relationship of the transistor, the means for measuring, and the differentiator can take on several different forms, as for example employment of an NPN or a PNP type transistor, with the PNP being selected where the monostable multivibrator output pulse is negative respective to the emitter of the multiplier, and with the NPN being selected where the monostable multivibrator output is positive respective to the emitter of the multiplier, so long as either expedient enables the multiplier transistor to conduct when the pulse is present.

If deemed desirable the means for measuring can alternatively be placed between the differentiator and the transistor, so long as the transistor acts as a conductor when it is "turned on" by the base pulse, when either a PNP or NPN transistor is employed. Moreover, a F.E.T. (Field Effect Transistor) can be used in lieu of the NPN or PNP transistors by following the teachings of this disclosure.

The present invention can be used to advantage by locating it remote from the vehicle being monitored. For example, analysis of sound waves from a race car, wherein the sound waves are treated to provide a proper wave form at 38 of FIG. 3, is considered to be within the comprehension hereof. With this type system in mind, one can determine the net horsepower, acceleration, and speed of a race car during some historical racing event, provided either a film or a recording of the past event is available for analysis, and that the weight and exhaust arrangement can be determined. Further, during a race, the signal at 19 of FIG. 2 can be sent by a transmitter to the pit, thereby enabling the present invention to remotely maintain the performance characteristics of the race car under surveillance.

I claim:

1. Performance analyzer for measurement of the performance characteristics of a vehicle comprising:
   a tachometer circuit means connected to the vehicle which produces a first electrical output signal of a frequency which is proportional to the velocity of the vehicle;
   said tachometer circuit means includes a signal conditioner and monostable multivibrator; said signal conditioner being connected to provide said monostable multivibrator with trigger pulses of current;
   a differentiator circuit means connected to said first output signal for providing a second output signal which is representative of the rate of change of said first output signal;
   said differentiator circuit means includes a filter circuit, a differentiator, and an amplifier; said filter circuit being connected to said monostable multivibrator which converts the last said signal to a direct current wherein the direct current is proportional to the frequency of said first signal;
   said direct current being connected to said differentiator by a source follower means for improving the response rate of said filter and said differentiator;
   a multiplying circuit means including a transistor which multiplies said first and second output signals together to provide a third output signal representative of the net horsepower of the vehicle;
   said transistor having a base, an emitter, and a collector;
   a single source of power, a means for mesuring; said transistor having the base thereof connected to said first electrical signal, the emitter connected to said second electrical signal, and the collector connected to said means for measuring; said means for measuring being connected to said single source of power, so that current flow occurs from said power source, through said means for measuring, and to the collector of the transistor.

2. The apparatus of claim 1 wherein said means for measuring is an ampmeter which is series connected to said source of power and to said collector so that the pulse signal spacing to said base and the differentiator output to said emitter provides an opposite voltage relative to said source of power which is proportional to the net horsepower of said vehicle.

3. A performance analyzer apparatus for determining the dynamic characteristics of a moving member comprising:
   first means, including circuitry, connected to the member for producing a first electrical signal which is proportional to the velocity of the member;
   second means, including circuitry, for producing a second electrical signal which is proportional to the rate of change of said first signal;
   multiplier means, including circuitry, for multiplying said first and second signals together to produce a third electrical signal;
   and means for measuring the value of said third signal to thereby determine said dynamic characteristics of the member;
   said circuitry of said multiplier means includes a transistor having a collector, an emitter, and a base; said second means is electrical circuitry which includes a differentiator; and, further including a single fixed voltage source;
   said means for measuring being series connected between said fixed voltage source and the collector of said transistor;
   switch means by which the output of said differentiator is selectively connected to said means for measuring or to the emitter of said transistor; switch means by which the base of said transistor is selectively connected to said first electrical signal or to ground so that a pulse signal spacing to the base and the differentiator output to either of the collector and emitter junctions of the transistor provides an opposite voltage at the means for measuring which is proportional to the net horsepower of the moving member.

4. The analyzer of claim 3 wherein said means for measuring is an ampmeter which is series connected to said source of power and to said collector so that the pulse signal spacing to said base and the differentiator output to said emitter provides an opposite voltage relative to said source of power which is proportional to the net horsepower of said vehicle.

5. The analyzer of claim 4 wherein said switch means are placed in one position to measure horsepower, another position to measure acceleration, and still another position to measure velocity.

* * * * *